United States Patent Office 3,836,527
Patented Sept. 17, 1974

3,836,527
WATER-SOLUBLE STEROL SULFATES
Klaus Irmscher, Darmstadt, Karl-Otto Freisberg, Speyer, and Dieter Orth, Herbert Nowak, and Zdenek Simane, Darmstadt, Germany, assignors to Merck Patent Gesellschaft mit beschrankter Haftung, Darmstadt, Germany
No Drawing. Filed Jan. 22, 1973, Ser. No. 325,400
Claims priority, application Germany, Jan. 22, 1972,
P 22 03 048.4
Int. Cl. C07c 173/00
U.S. Cl. 260—239.55 A        10 Claims

ABSTRACT OF THE DISCLOSURE

Water-soluble sterol sulfates of the formula

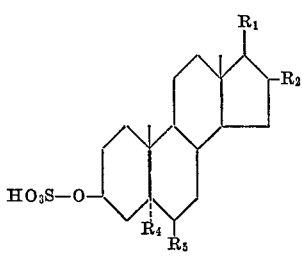

wherein $R_1$ is

—$CH(CH_3)$—$(CH_2)_2$—$CH(R_3)$—$CH$—$(CH_3)_2$, $R_2$ is H and $R_3$ is H or $C_2H_5$; or $R_1$ and $R_2$ together form the group A

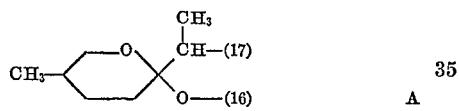

and wherein $R_4$ and $R_5$ are each O—$SO_3H$ when $R_1$ and $R_2$ are other than A, and $R_4$ and $R_5$ are each O—$SO_3H$ or together form the second valence bond of a double bond when $R_1$ and $R_2$ are A, and the physiologically acceptable salts thereof, possess valuble pharmacological properties which are useful in the treatment of hyperlipoproteinemias, especially in the treatment of hypercholesterolemias, hyperglyceridemias and hyperphospholipidemias.

BACKGROUND OF THE INVENTION

This invention relates to novel water-soluble sterol sulfates and to their preparation and use.

Compounds related to those of this invention but having hydrogen atoms or free hydroxy groups in place of the sulfate groups of this invention are known in the art. For example, cholestane is the parent hydrocarbon of cholesterol; diosgenin is a plant steroid from which testosterone can be prepared; stigmastane (also called sitostane) is the parent hydrocarbon of the sitosterols and stigmasterols; and spirostane is the parent hydrocarbon of several derivatives useful in the synthesis of physiologically active steroids, e.g., progesterone. However, the primary utility of these prior art compounds has been as an intermediate in the preparation of other physiologically active steroids, as these hydrocarbons themselves exhibit little or no pharmaceutical activity.

The sodium salt of β-sitosterol 3-sulfate is known and has been described by A.M. Khaletskii et al. in Zh. Obshch. Khim. *26*, 1201 (1956); *31*, 2996 (1961); and C.A. *58*, 11437 (1963). It has the disadvantage of exhibiting its activities only at relative high doses.

While the above compounds have heretofore been widely used in the art as intermediates in the synthesis of steroids, the compounds themselves for the most part exhibit no useful pharmaceutical properties.

OBJECTS OF THE INVENTION

Accordingly, it is a general object of this invention to provide novel water-soluble sterol sulfates and methods for their preparation and use.

Another object of this invention is to provide pharmaceutical compositions suitable for the treatment of hyperlipoproteinemias.

A further object of this invention is to provide pharmaceutical compositions useful in lowering serum phospholipid, triglyceride and cholesterol levels, particularly in animals afflicted with hyperlipoproteinemia, and especially in humans.

An additional object of this invention is to provide a process for treating hyperlipoproteinemia in animals, particularly in humans.

Yet another object of this invention is to provide a process for preparing a pharmaceutical composition suitable for the treatment of hyperlipoproteinemia.

Upon further study of the specification and appended claims, further objects and advantages of this invention will become apparent to those skilled in the art.

SUMMARY OF THE INVENTION

Briefly, the above and other objects are attained in one aspect of this invention by providing novel sterol sulfates of the formula

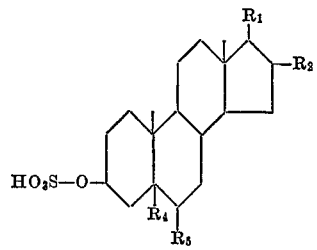

wherein $R_1$ is

—$CH(CH_3)$—$(CH_2)_2$—$CH(R_3)$—$CH$—$(CH_3)_2$, $R_2$ is H and $R_3$ is H or $C_2H_5$; or $R_1$ and $R_2$ together form the group A

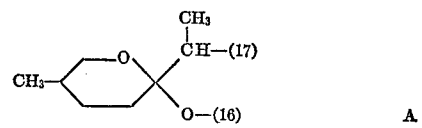

and $R_4$ and $R_5$ are each O—$SO_3H$ when $R_1$ and $R_2$ are other than A, and $R_4$ and $R_5$ are each O—$SO_3H$ or together form the second valence bond of a double bond when $R_1$ and $R_2$ are A, the physiologically acceptable salts thereof, and processes for their preparation and use.

In another aspect of this invention, pharmaceutical compositions are provided containing one or more of the above compounds as a lipoprotein lowering agent in combination with a pharmaceutically acceptable carrier.

DETAILED DISCUSSION

Due to their valuable pharmacological properties, the compounds of Formula I are useful in the treatment of hyperlipoproteinemias, especially in the treatment of hypercholesterolemias, hyperglyceridemias and hyperphospholipidemias in animals and particularly in humans. These compounds can accordingly be used as drugs. Due to their solubility in water and other polar solvents, the compounds of Formula I offer special advantages in many such applications. Furthermore, they can be used as intermediates for the production of other biologically active drugs in a manner analogous to the use of diosgenin, cholestane, stigmastane, spirostane and their known derivatives. Due to their solubility in water and other polar solvents, the compounds of Formula I offer special advantages in many such applications.

Due to their lipoprotein lowering activity, preparations of this invention are particularly useful as lipoprotein-lowering agents in human and veterinary medicine. They are suitable for the treatment of primary and secondary hyperlipoproteinemias, as well as primary and secondary hyperlipidemias, e.g., hypercholesterolemia, hypertriglyceridema and hyperphospholipidemia.

This invention relates to water-soluble sterol sulfates of general Formula I, as well as to their physiologically acceptable salts. Among the compounds of this invention, those of Formulae Ia, Ib and Ic, as well as the physiologically acceptable salts thereof, are especially preferred.

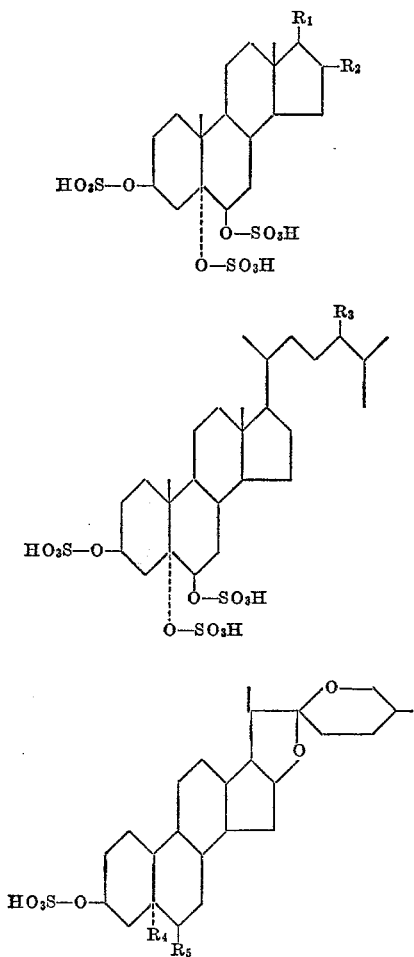

The compounds of general Formula I, as well as the physiologically compatible salts thereof, are prepared by a process which comprises esterifying known compounds which otherwise correspond to Formula I but have free hydroxy groups in place of one or more sulfate groups, with sulfuric acid or a functional derivative thereof suitable for esterification, and optionally converting the resultant sulfuric acid esters into the physiologically compatible salts thereof by treatment with suitable bases.

Functional derivatives of sulfuric acid suitable for the esterification reaction include but are not limited to amido-sulfonic acid, chlorosulfonic acid, sulfur trioxide, or the adducts of sulfur trioxide with dioxane, pyridine, dimethylaniline, diethylaniline, or other tertiary bases. Preferred functional derivatives are amidosulfonic acid and the pyridine adduct of sulfur trioxide.

The hydroxy steroid is normally reacted with the sulfuric acid derivative in the presence of an additional solvent. If an acid, e.g., hydrogen chloride, is split off during the reaction, as in the use of chlorosulfonic acid for esterification, preferred solvents in this connection include one or more organic bases, e.g., pyridine, triethylamine, quinoline, dimethylaniline and diethylaniline. Otherwise, or additionally, neutral inert organic solvents can be used, e.g., ether, diisopropyl ether, tetrahydrofuran, dioxane, chloroform, methylene chloride, trichloroethylene, dimethylformamide, dimethyl sulfoxide, benzene, toluene, xylene, tetrahydronaphthalene ("Tetralin") and/or acetonitrile. It is also possible to conduct the reaction in an excess of the sulfuric acid derivative which then itself serves as a solvent. The reaction temperatures range between $-80°$ C. and $+200°$ C., preferably between $-10°$ and $+100°$ C. Depending on the reagent and the temperature, the reaction is terminated after reaction times of between 5 minutes and about 100 hours. The reaction mixture is worked up by conventional extraction, distillation, crystallization or chromatography techniques. Processes for the production of sulfuric acid esters and the salts thereof which are described in the literature can generally be employed.

The thus-obtained sulfuric acid esters can be converted into the corresponding physiologically acceptable salts by treatment with a base. This reaction time is normally effected under cold conditions, and the solvents employed herein are preferably water; lower alcohols, e.g., methanol or ethanol; mixtures of water with lower alcohols; or the organic bases employed for the salt formation.

Suitable physiologically acceptable acid addition salts are primarily those with mono-, di- or trivalent cations. Suitable cations include but are not limited to ammonium and monovalent cations of the alkali metal series, e.g., lithium, sodium and potassium; divalent cations of the alkaline earth metal series, e.g., magnesium and calcium; and trivalent cations, e.g., aluminum. Especially preferred are the sodium salts.

Preferred bases are the hydroxides, carbonates or alcoholates of the alkali and alkaline earth metals, as well as the corresponding ammonium compounds, e.g., sodium hydroxide, potassium hydroxide, calcium hydroxide and magnesium hydroxide; sodium carbonate, potassium carbonate, calcium carbonate and magnesium carbonate; sodium, potassium, calcium or magnesium bicarbonate; sodium, potassium, calcium, or magnesium methylate, ethylate, isopropylate, or tert.-butylate; and furthermore, ammonium hydroxide, carbonate, or bicarbonate; substituted ammonium hydroxides, carbonates, or bicarbonates; and organic bases such as pyridine.

The compounds of this invention can be employed in admixture with conventional excipients, i.e., one or more pharmaceutically acceptable organic or inorganic carrier substances suitable for parenteral or enteral application which do not deleteriously react with the active compounds. Suitable pharmaceutically acceptable carriers include but are not limited to water, salt solutions, glycerin, alcohols including benzyl alcohol and higher fatty alcohols, vegetable oils, polyethylene glycols, gelatin, lactose, amylose, magnesium stearate, talc, titanium dioxide, silicic acid, viscous paraffin, perfume oil, fatty acid monoglycerides and diglycerides, pentaerythritol fatty acid esters, hydroxy methylcellulose, polyvinyl pyrrolidone, etc. The pharmaceutical preparations can be sterilized and if desired mixed with auxiliary agents, e.g., lacquers, lubricants, preservatives, stabilizers, wetting agents, solubilizers, emulsifiers, plasticizers, salts for influencing osmotic pressure, buffers, coloring, flavoring and/or aromatic substances and the like which do not deleteriously react with the active compounds. Sustained release compositions can be formulated including those wherein the active compound is protected with differentially degradable coatings, e.g., by microencapsulation, multiple coatings, etc.

For parenteral application, particularly suitable are solutions, preferably oily or aqueous solutions, as well as suspensions, emulsions or implants. Ampoules are convenient unit dosages for liquid preparations.

For peroral enteral application, suitable are tablets, dragees or capsules having talc and/or a carbohydrate carrier or binder or the like, the carrier preferably being lactose, corn starch, potato starch, amylopectin, saccarose, sorbitol, mannitol, pulverized laminaria, pulverized citrus gum arabic or the like. A syrup, elixir or the like can be used wherein a sweetened vehicle is employed. For rectal enteral application, lubricated suppositories are conveniently used.

Preferably, however, the compounds of this invention are provided in form of a drinkable solution (such as an elixir or a cocktail which contains the active agent and, if desired, flavoring substances and/or sweetening agents. The compounds of the invention may also be provided as such in form of a water-soluble powder, if desired, in admixture with flavoring substances and/or sweetening agents.

One unit dosage of these forms of administration may comprise 100 mg. to 20 g., preferably 1 to 5 g. of a compound of the formula I.

Those compounds of the formula I containing three sulfate ester groups may also be provided in form of an effervescent tablet, which contains, for example, a weak organic acid such as citric acid or ascorbic acid, sodium hydrogen carbonate, calcium carbonate, a sugar such as glucose, coloring agents, flavoring substances, and/or a lubricant such as sodium benzoate. One unit dosage of such an effervescent tablet may contain 100 mg. to 2 g. of the active compound mentioned above.

The compounds of this invention may also be dispensed in tablets or dragees comprising 50 to 1000 mg. of a pharmaceutical carrier per unit dosage, and the amount of the active compound per unit dosage may be about 100 to 1000 mg.

The compounds of this invention are generally administered to animals, including but not limited to poultry and mammals, e.g., humans, laboratory animals, livestock and household pets. A lipid-lowering effective daily dosage of the active compounds as administered orally to humans generally comprises about 10 to 300, preferably 100 to 250 mg./kg., together with a physiologically acceptable carrier. The dose can be administered singly or as divided dosages throughout the day.

The usefulness of the compounds of this invention as serum lipid-lowering agents has been established in laboratory test animals. Oral administration is preferred, the compounds of this invention being particularly valuable in the treatment of humans afflicted with primary and secondary hyperlipoproteinemias or primary and secondary hyperlipidemias. In this regard, they can be employed in substantially a similar dosage as the known compound cholestyramine the formulation of which, however, offers certain difficulties which are connected with the fact that said drug is not soluble in water.

It will be appreciated that the actual preferred amounts of active compounds used will vary according to the specific compound being utilized, the particular compositions formulated, the mode of application, and the particular situs and organism being treated. Optimal application rates for a given set of conditions can be ascertained by those skilled in the art using conventional dosage determination tests in view of the above guidelines.

Without further elaboration, it is believed that one skilled in the art can, using the preceding description, utilize the present invention to its fullest extent. The following preferred specific embodiments are, therefore, to be construed as merely illustrative and not limitative of the remainder of the specification in any way whatsoever. In the following examples, the temperatures set forth uncorrected in degrees Celsius; unless otherwise indicated, all parts and percentages are by weight.

The following non-limiting pharmacological examples illustrate the effect of the novel sterol sulfates:

(A) Reduction of an Experimentally Induced Hyperlipoproteinemia

The experiments were conducted on acclimated male Wistar rats weighing 180–200 g. The animals were perorally fed the compounds indicated in the table for 14 days. On the last day, a blood sample was withdrawn retroorbitally and the total cholesterol content of the serum was determined in accordance with the method described by Levine and collaborators in "Automation in Analytical Chemistry," edited by L. T. Skeggs, New York, 1967, p. 25. The animals were then sacrificed and the serum triglyceride content was determined according to the method of Noble and Campbell described in Clinical Chemistry 16:166 (1970). Each test group consisted of 10 animals at the beginning of the experiment. The results were compared to a control group of 20 rats which, under the same experimental conditions, received feed and drinking water without drugs.

The results of the experiments compiled in the Table show that compounds III–VI of this invention exhibit markedly stronger cholesterol-lowering and triglyceride-lowering effects than the prior art compound II.

The following data with respect to cholesterol-level-lowering and triglyceride-level-lowering effects were obtained in pharmacological investigations using the sodium salt of diosgenin-3-sulfate (III), the trisodium salt of cholestane-3β,5α,6β-trisulfate (IV), the trisodium salt of stigmastane-3β,5α,6β-trisulfate (V), and the trisodium salt of spirostane-3β,5α,6β-trisulfate (VI) in a comparison with the known sodium salt of β-sitosterol-3-sulfate (II).

| Compound | Dosage (ad lib) | Percent change in— | |
|---|---|---|---|
| | | Colesterol level | Triglyceride level |
| II (control) | 2% F | −25 | −23 |
| III | 2% F | −56 | −45 |
| IV | 2% F | −54 | −50 |
| V | 2% DW | −31 | −45 |
| VI | 2% DW | −42 | −22 |

NOTE.—F=admixture to the feed; DW=admixture to the drinking water.

It can be seen that compounds III–VI of this invention exhibit a markedly stronger cholesterol-level- and/or triglyceride-level-lowering effect than the closest known prior art, compound II.

The following examples further illustrate the compounds of this invention.

EXAMPLE 1

Under agitation, 10 g. of diosgenin, 10 g. of amidosulfonic acid, and 100 ml. of pyridine are heated to 100° for one hour. Then, 200 ml. of 2N sodium hydroxide solution is added to the reaction mixture and the latter heated for another 10 minutes. Upon the addition of 200 ml. of water, the sodium salt of diosgenin-3-sulfate is separated. There is no sharp melting point.

| | Analysis | | | |
|---|---|---|---|---|
| | C | H | S | Na |
| Calculated | 62.77 | 8.0 | 6.2 | 4.45 |
| Found | 62.7 | 7.99 | 5.9 | 4.3 |

IR spectrum: 8.1μ (wide double band); 9.3μ (single band).

EXAMPLE 2

50 g. of cholestane-3β,5α,6β-triol (producible from cholesterol by reaction with performic acid) is heated together with 125 g. of amidosulfonic acid and 1 liter of pyridine to 100° for 3 hours under agitation. Then, a hot saturated aqueous solution of 750 g. of NaOH is added thereto and the mixture heated for another 30 minutes.

The residue from the upper layer is made into a slurry with acetone; then, the mixture is vacuum-filtered and washed with acetone. The remainder is screened, mixed with 500 g. of sand, and introduced into a column filled with 750 g. of silica gel. An elution is first conducted with chloroform/methanol 10:1, thereafter with chloroform/methanol 5:1, and finally with chloroform/methanol 1:1. The fractions obtained with chloroform/methanol 1:1 are evaporated, and about 56 g. of material is thus obtained which is suspended under heating in 4 liters of petroleum ether. The product is dissolved by adding methanol, filtered, and the filtrate is concentrated to 1.5 liters. The trisodium salt of cholestane-3$\beta$,5$\alpha$,6$\beta$-trisulfate is produced. There is no sharp melting point.

|  | Analysis | | | |
| --- | --- | --- | --- | --- |
|  | C | H | S | Na |
| Calculated | 43.54 | 6.36 | 12.91 | 9.26 |
| Found | 43.1 | 6.51 | 12.7 | 8.9 |

IR spectrum: 8.25$\mu$ (wide double band); 9.40$\mu$ (single band).

In an analogous manner, the trisodium salt of stigmastane-3$\beta$-5$\alpha$,6$\beta$-trisulfate is obtained from stigmastane-3$\beta$,5$\alpha$,6$\beta$-triol by reaction with amidosulfonic acid; no sharp melting point.

|  | Analysis | | | |
| --- | --- | --- | --- | --- |
|  | C | H | S | Na |
| Calculated | 43.06 | 6.85 | 11.89 | 8.53 |
| Found | 42.3 | 6.50 | 11.6 | 8.8 |

IR spectrum: 8.2$\mu$ (wide double band); 9.35$\mu$ (single band).

Analogously, the trisodium salt of spirostane-3$\beta$,5$\alpha$,6$\beta$-trisulfate is obtained from spirostane-3$\beta$,5$\alpha$,6$\beta$-triol; no sharp melting point.

|  | Analysis | | | |
| --- | --- | --- | --- | --- |
|  | C | H | S | Na |
| Calculated | 42.97 | 5.47 | 12.74 | 9.14 |
| Found | 42.5 | 5.4 | 12.6 | 8.9 |

IR spectrum: 8.25$\mu$ (wide double band); 8.4$\mu$ (single band).

EXAMPLE 3

At −10°, a solution of 2 g. of chlorosulfonic acid in 20 ml. of dry pyridine is added to a solution, cooled to −10°, of 5 g. of diosgenin in 40 ml. of dry pyridine. After allowing the reaction mixture to stand for 5 hours at room temperature, the reaction solution is mixed with 100 ml. of absoltue ether and vigorously shaken. The solution is decanted off from the precipitate; the latter is washed with a small amount of ether, dried, mixed with a mixture of 45 ml. of 12% sodium hydroxide solution and 30 ml. of pyridine, and thoroughly shaken. Upon the addition of water, the sodium salt of diosgenin-3-sulfate is separated.

EXAMPLE 4

A solution of 5.2 g. of diosgenin in 20 ml. of dry pyridine is mixed with a 10% excess of pyridine-sulfurtrioxide adduct and agitated for 12 hours at 20°. The crude pyridinium salt, separated by the addition of 170 ml. of ether, is isolated, washed with a small amount of ether, and dried, then dissolved in 30 ml. of absolute methanol, adjusted to pH 10 with sodium methylate, and allowed to stand at 20° for 12 hours. The reaction mixture is then filtered over activated carbon, concentrated to about 15 ml., and mixed with an excess of ether. The sodium salt of diosgenin-3-sulfate is thus obtained.

EXAMPLE 5

5 g. of diosgenin is heated with 5 g. of amidosulfonic acid in 50 ml. of pyridine to 100° for one hour. Subsequently, 100 ml. of absolute ether is added to the cooled down reaction solution, and the thus-precipitating pyridinium salt of the sulfuric acid ester is isolated and dried. The product is thereupon dissolved in 1 mole of ammonium hydroxide, and the thus-produced ammonium salt is extracted with n-butanol. After the solvent has been distilled off, the ammonium salt of diosgenin-3-sulfate is reprecipitated from ether/water. The product does not crystallize.

|  | Analysis | | | |
| --- | --- | --- | --- | --- |
|  | C | H | N | S |
| Calculated | 63.41 | 8.86 | 2.73 | 6.25 |
| Found | 63.62 | 8.91 | 2.49 | 6.12 |

IR spectrum: 8.25$\mu$ (wide double band); 8.4$\mu$ (single band); 2.75$\mu$ (wide band); 7.2$\mu$ (sharp band).

It will be apparent that when $R_4$ and $R_5$ form a double bond in Formula I it is at the 5,6 position.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A sterol sulfate of the formula

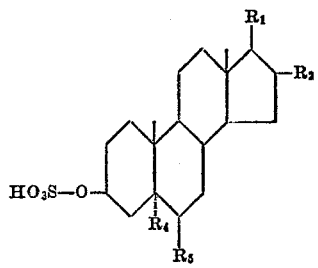

wherein $R_1$ is

—CH(CH$_3$)—(CH$_2$)$_2$—CH(R$_3$)—CH—(CH$_3$)$_2$, $R_2$ is H and $R_3$ is H or C$_2$H$_5$; or $R_1$ and $R_2$ together form the group A

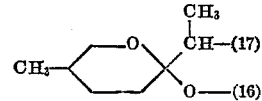

and $R_4$ and $R_5$ are each O—SO$_3$H when $R_1$ and $R_2$ are other than A, and $R_4$ and $R_5$ are each O—SO$_3$H or together form the second valence bond of a double bond when $R_1$ and $R_2$ are A, and the physiologically acceptable salts thereof.

2. A compound according to Claim 1 wherein $R_4$ and $R_5$ are both O—SO$_3$H.

3. A compound according to Claim 1 wherein $R_1$ is —CH(CH$_3$)—(CH$_2$)$_2$—CH(R$_3$)—CH—(CH$_3$)$_2$ and $R_2$ is H.

4. A compound according to Claim 3 wherein $R_3$ is H.

5. A compound according to Claim 1 wherein $R_1$ and $R_2$ together form the group A and $R_4$ and $R_5$ together form the second valence bond of a covalent double bond.

6. A compound according to Claim 1 in the form of a sodium salt.

7. A compound of Claim 1, the sodium salt of diosgenin-3-sulfate.

8. A compound of Claim 1, the trisodium salt of cholestane-3β,5α,6β-trisulfate.

9. A compound of Claim 1, the trisodium salt of stigmastane-3β,5α,6β-trisulfate.

10. A compound of Claim 1, the trisodium salt of spirostane-3β,5α,6β-trisulfate.

References Cited
UNITED STATES PATENTS 3,657,290   4/1972   Skokie et al. _____ 260—397.45
3,160,626   12/1964   Onley et al. ____ 260—239.55 A ELBERT L. ROBERTS, Primary Examiner U.S. Cl. X.R.

424—238, 241; 260—397.2